(12) United States Patent
Schmidt et al.

(10) Patent No.: US 10,458,446 B1
(45) Date of Patent: Oct. 29, 2019

(54) MATERIAL FLOW AMPLIFIER

(71) Applicant: Vortex Pipe Systems LLC, Cuero, TX (US)

(72) Inventors: Paul Wayne Schmidt, Carlton, OR (US); Avijit Ghosh, Cuero, TX (US)

(73) Assignee: Vortex Pipe Systems LLC, Cuero, TX (US)

(*) Notice: Subject to any disclaimer, the term of this patent is extended or adjusted under 35 U.S.C. 154(b) by 0 days.

(21) Appl. No.: 16/445,127

(22) Filed: Jun. 18, 2019

Related U.S. Application Data

(60) Provisional application No. 62/917,233, filed on Nov. 29, 2018.

(51) Int. Cl.
  *B01F 5/06* (2006.01)
  *F15C 1/18* (2006.01)

(52) U.S. Cl.
  CPC ............... *F15C 1/18* (2013.01); *B01F 5/064* (2013.01); *B01F 5/0614* (2013.01); *B01F 5/0651* (2013.01); *B01F 5/0659* (2013.01)

(58) Field of Classification Search
  CPC ........ F15C 1/18; B01F 5/0651; B01F 5/0614; B01F 5/064; B01F 5/0659
  See application file for complete search history.

(56) References Cited

U.S. PATENT DOCUMENTS

| | | | | |
|---|---|---|---|---|
| 1,496,345 A | * | 6/1924 | Lichtenthaeler | B01F 5/0451 366/165.2 |
| 1,500,103 A | * | 7/1924 | Burdon | F23C 99/00 431/166 |
| 1,513,624 A | * | 10/1924 | Parker | B05B 7/04 239/404 |
| 1,777,141 A | * | 9/1930 | Howden | F02M 69/00 239/419 |
| 1,959,907 A | * | 5/1934 | Ebert | F02M 17/44 261/41.2 |

(Continued)

FOREIGN PATENT DOCUMENTS

GB          2312276 A      10/1997

OTHER PUBLICATIONS

International Search Report and Written Opinion, dated Jan. 29, 2018, PCT/US17/62061.

*Primary Examiner* — Charles Cooley
(74) *Attorney, Agent, or Firm* — IVC Patent Agency; David O. Simmons

(57) ABSTRACT

Material flow amplifiers as disclosed herein overcome drawbacks associated with known adverse flow conditions (e.g., surface erosion and head losses) that arise from flow of certain types of materials (e.g., fluids, slurries, particulates, flowable aggregate, and the like) through a material flow conduit. Such material flow amplifiers provide for flow of flowable material within a flow passage of a material flow conduit (e.g., a portion of a pipeline, tubing or the like) to have a cyclonic flow (i.e., vortex or swirling) profile. Advantageously, the cyclonic flow profile centralizes flow toward the central portion of the flow passage, thereby reducing magnitude of laminar flow. Such cyclonic flow profile provides a variety of other advantages as compared to a parabolic flow profile (e.g., increased flow rate, reduce inner pipeline wear, more uniform inner pipe wear, reduction in energy consumption, reduced or eliminated slugging and the like).

23 Claims, 8 Drawing Sheets

(56) References Cited

U.S. PATENT DOCUMENTS

| | | | |
|---|---|---|---|
| 1,974,110 A | 9/1934 | Higley | |
| 2,274,599 A | 2/1942 | Freeman | |
| 2,300,130 A | 10/1942 | McCurdy | |
| 2,784,948 A * | 3/1957 | Pahl | B01F 5/0451 366/174.1 |
| 2,816,518 A * | 12/1957 | Daggett | A23G 9/282 222/145.6 |
| 2,831,754 A * | 4/1958 | Manka | B01D 11/0473 423/658.5 |
| 4,339,918 A | 7/1982 | Michikawa | |
| 5,743,637 A * | 4/1998 | Ogier | B01F 3/12 138/44 |
| 5,992,465 A | 11/1999 | Jansen | |
| 8,033,714 B2 * | 10/2011 | Nishioka | B01D 53/8631 137/888 |
| 10,092,886 B2 * | 10/2018 | Kashihara | B01F 3/02 |
| 10,201,786 B2 * | 2/2019 | Okada | B01F 5/0614 |
| 2017/0306994 A1 | 10/2017 | Schmidt et al. | |

* cited by examiner

MATERIAL FLOW AMPLIFIER

CROSS-REFERENCE TO RELATED APPLICATIONS

This non-provisional utility patent application claims priority from U.S. Provisional Patent Application having Ser. No. 62/917,233, filed 29 Nov. 2018, entitled "Multi-Chambered Vortex Pipeline Amplifier (Fully Piggable)", having a common applicant herewith and being incorporated herein in its entirety by reference.

FIELD OF THE DISCLOSURE

The disclosures made herein relate generally to structural devices used for transmission of flowable materials and, more particularly, to devices used for enhancing flow attributes of material within a material flow conduit such as a pipeline or a tubular flow member.

BACKGROUND

The need to flow materials (i.e., flowable material) through a material flow conduit is well known. Examples of such materials include, but are not limited to, fluids, slurries, particulates, flowable aggregate, and the like. Examples of such material flow conduit include, but are not limited to, pipes, pipelines, conduits, tubular flow members, and the like.

As shown in FIG. 1, conventional low of flowable material 5 within a flow passage 10 of a material flow conduit 15 has a flow profile characterized by laminar flow effect (i.e., laminar flow 20). The parabolic flow profile is a result of the laminar boundary layer along the surface of the material flow conduit 15 defining the flow passage 10. Flowable material at the surface of the flow passage 10 exhibits considerable friction and zero flow velocity, thereby reducing velocity of the flowable material even at a considerable distance from the surface of the flow passage 10. In association with this reduced velocity, the laminar flow effect (e.g., friction at the surface of the material flow conduit) is known to increase head loss and heating of the flowable material.

There are various well-known flow consideration that arises when abrasive material flows through a material flow conduit such as a pipeline. One such consideration is erosion (i.e., wearing) of the material flow conduit. Transport and pumping flowable material comprising abrasive contents, such as coal and sand slurries, wet sand, gravel and the like can cause especially high costs associated with component wear due to interaction between the flowable material and the surface defining the passage through which such material flows. Additionally, uneven erosion in piping systems, especially elbow fittings, is well known to lead to fitting failure or early fitting replacement, either of which is costly in material, manpower and downtime.

When fluids or flowable material passes through an elbow fitting, the change in direction creates turbulent conditions, flow separation and vortex shedding along the pipe wall at the inside of the bend. This change in direction may also create standing eddies causing backflow conditions at points along the elbow fitting pipe walls. These conditions generally cause the elbow fitting pipe wall along the outside of the bend to erode substantially faster than the pipe wall along the inside of the bend because the flowable material impinges directly against the wall along the outside of the bend as it enters the fitting and changes direction. Additionally, due to centrifugal force, heavier solids and particulates are generally thrown to the outside wall as the flowable material changes direction and tend to continually scour the outer wall.

A similar uneven erosion effect is often experienced in long straight pipe runs. For example, the concentration of particulates of a flowable material will increase in the lower region of the fluid in long straight runs, making the bottom portion of the fluid stream more abrasive than the upper portion. Additionally, in large diameter piping systems, the weight of the flowable material is borne by the lower pipe wall portion thereby causing higher erosion rates.

Another well-known flow consideration that arises is head loss due to turbulence and flow separation in an elbow fitting. Higher pumping pressures can be utilized for mitigating this head loss resulting from such head losses. However, higher pumping pressures are generally implemented at the expense of higher energy consumption and associated cost. Additionally, implementation of higher pumping pressures often creates vibration and heating problems in the piping system.

Long radius elbow fittings and pipe sections can reduce these adverse flow considerations. However, long radius fittings require a great deal of space relative to standard (i.e., short) radius fittings. Additionally, long radius fittings still suffer accelerated erosion rates along the pipe wall along the outside of the bend because centrifugal force still causes heavier, more abrasive flowable materials to be thrown to the outer wall, and they are continually scoured by on-going flow of such flowable material.

Therefore, a device that overcomes drawbacks associated with known flow considerations that arise from flow of abrasive material flowing through a material flow conduit would be beneficial, desirable and useful.

SUMMARY OF THE DISCLOSURE

Embodiments of the present invention are directed to a device that overcomes drawbacks associated with known adverse flow conditions in pipe structures through a mechanical flow pumping device or a gravity flow system (e.g., surface erosion, head losses, fluid cavitation, heating, etc.) that arise from flow of certain types of materials (e.g., fluids, slurries, particulates, flowable aggregate, and the like) through a material flow conduit. A material flow amplifier in accordance with one or more embodiments of the present invention provides for flow of flowable material within a flow passage of a material flow conduit (e.g., a portion of a pipeline, tubing or the like) to have a cyclonic flow (i.e., vortex or swirling) profile. Advantageously, such a cyclonic flow profile centralizes flow toward the central portion of the flow passage, thereby reducing magnitude of a laminar flow. Such cyclonic flow profile provides a variety of other advantages as compared to a parabolic flow profile resulting from laminar flow (e.g., increased flow rate, reduce inner pipeline wear, more uniform inner pipe wear, reduction in energy consumption, reduced or eliminated slugging and the like).

In one or more embodiments of the present invention, a material flow amplifier comprises an amplifier body, at least one helix vane, and a centralizer tube. The amplifier body has a flow inlet structure, a flow expander, a vortex chamber, a flow mixer and a flow outlet structure all in fluid communication with each other for forming a fluid flow path therethrough. The flow expander extends from the flow inlet structure, the vortex chamber extends from the flow expander, the flow mixer extends from the vortex chamber, and the flow outlet structure extends from the flow mixer. The at least one helix vane is within the vortex chamber and extends at least intermittently (or, in some embodiments, continually) from a helix vane first end proximate the flow expander to a helix vane second end proximate the flow mixer. At least a portion of an outer edge portion of the at least one helix vane is attached to an interior surface of the amplifier body within the vortex chamber. The at least one helix vane includes a material impinging surface oriented at an angle of incidence to the flowable material entering the vortex chamber from the flow expander. The centralizer tube is within the amplifier body extending at least a portion of the length of the vortex chamber. At least a portion of an inner edge portion of the at least one helix vane is attached to an exterior surface of the centralizer tube.

In one or more embodiments of the present invention, an elbow flow amplifier comprises an amplifier body, a plurality of helix vanes and a curved centralizer tube. The amplifier body has a flow inlet structure, a flow expander, a curved vortex chamber, a flow mixer and a flow outlet structure all in fluid communication with each other for forming a fluid flow path therethrough. The flow expander extends from the flow inlet structure, the vortex chamber extends from the flow expander, the flow mixer extends from the vortex chamber and the flow outlet structure extends from the flow mixer. The plurality of helix vanes is within the vortex chamber and extends from a helix vane first end proximate the flow expander to a helix vane second end proximate the flow mixer. An outer edge portion of each of the helix vanes is attached to an interior surface of the amplifier body within the vortex chamber. Each of the helix vanes includes a material impinging surface oriented at an angle of incidence to the flowable material entering the vortex chamber from the flow expander. The curved centralizer tube is within the amplifier body and extends at least a portion of the length of the curved vortex chamber. An inner edge portion of each of the helix vanes is attached to an exterior surface of the curved centralizer tube. A centerline axis of the curved centralizer tube extends along a centerline axis of the curved vortex chamber.

In one or more embodiments of the present invention, a material flow amplifier comprises a flow inlet structure, a flow expander, a vortex flow inducer, a flow mixer, and a flow outlet structure. The flow inlet structure defines a nominal cross-sectional flow area. The flow expander includes an upstream portion thereof attached to and concentric with the downstream portion of the flow inlet structure. The flow expander includes a downstream portion thereof having a first expanded cross-sectional flow area relative to the nominal cross-sectional flow area. The vortex flow inducer comprises an exterior tubular body, a centralizer tube, and at least one at least one helical flow passage. An upstream portion of the exterior tubular body is attached to and concentric with a downstream portion of the flow expander. The centralizer tube extends at least a portion of the length of the exterior tubular body and has a cross-sectional flow area along an entire length thereof at least about the same as the nominal cross-sectional flow area. The at least one helical flow passage extends between the exterior tubular body and the centralizer tube and extends at least partially along a length of the centralizer tube. The at least one helical flow passage includes a material impinging surface oriented at an angle of incidence to the flowable material entering the exterior tubular body from the flow expander. A centerline axis of the centralizer tube extends along a centerline axis of the exterior tubular body. The flow mixer includes an upstream portion thereof having a second expanded cross-sectional flow area attached to and concentric with a downstream portion of the exterior tubular body. The second expanded cross-sectional flow area is smaller than the first expanded cross-sectional flow area. At least the upstream portion of the flow mixer is cylindrical. The flow outlet structure includes an upstream portion thereof attached to and concentric with a downstream portion of the flow mixer. The flow outlet structure has a downstream portion with a cross-sectional flow area at least about the same as the nominal cross-sectional flow area.

In one or more embodiments, a material flow amplifier can include a plurality of helix vanes.

In one or more embodiments, the helix vane first end of one or more of the helix vanes can be located adjacent to or within the flow expander and the helix vane second end of one or more of the helix vanes can be located within the vortex chamber.

In one or more embodiments, the centralizer tube can have a cross-sectional flow area along an entire length thereof at least about the same as the nominal cross-sectional flow area.

In one or more embodiments, a length of the centralizer tube is less than a length of the vortex chamber.

In one or more embodiments, the flow inlet structure, the flow expander, the vortex chamber, the flow mixer and the flow outlet structure can all be concentric with each other.

In one or more embodiments, a centerline axis of the vortex chamber can be curved.

In one or more embodiments, the flow mixer can include a cylindrical portion extending from the vortex chamber and a convergent portion extending from the cylindrical portion.

In one or more embodiments, the convergent portion of the flow mixer can have a curved sidewall profile or a straight-taper sidewall profile.

These and other objects, embodiments, advantages and/or distinctions of the present invention will become readily apparent upon further review of the following specification, associated drawings and appended claims.

DETAILED DESCRIPTION

Embodiments of the present invention are directed to material flow amplifiers that provide for increased volumetric flow rates for flowable material (e.g., fluids, slurries, particulates, flowable aggregate, and the like) and reductions in wear to material flow conduits through which flow of such flowable materials is provided. These material flow amplifiers induce a cyclonic (i.e., a vortex or swirling) flow profile that advantageously overcomes drawbacks associated with known adverse flow conditions (e.g., internal pipe wall erosion, head losses, material heating) that can arise from flow of various types of flowable materials flowing through a material flow conduit in a conventional manner (e.g., under laminar flow effect).

Figure 1:
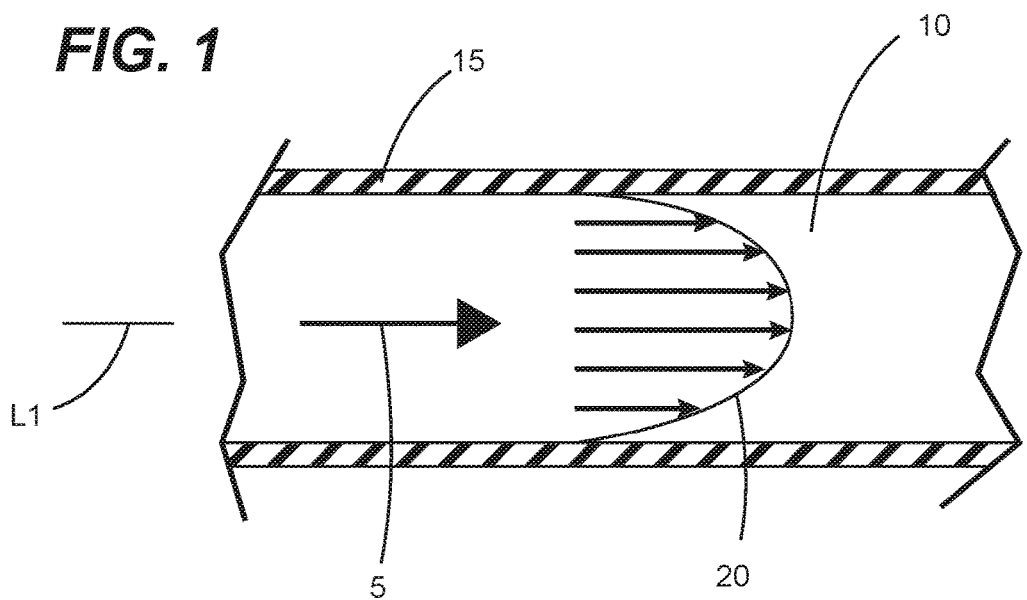
FIG. 1 is a diagrammatic view showing laminar flow effect within a material flow conduit.
Figure 2:
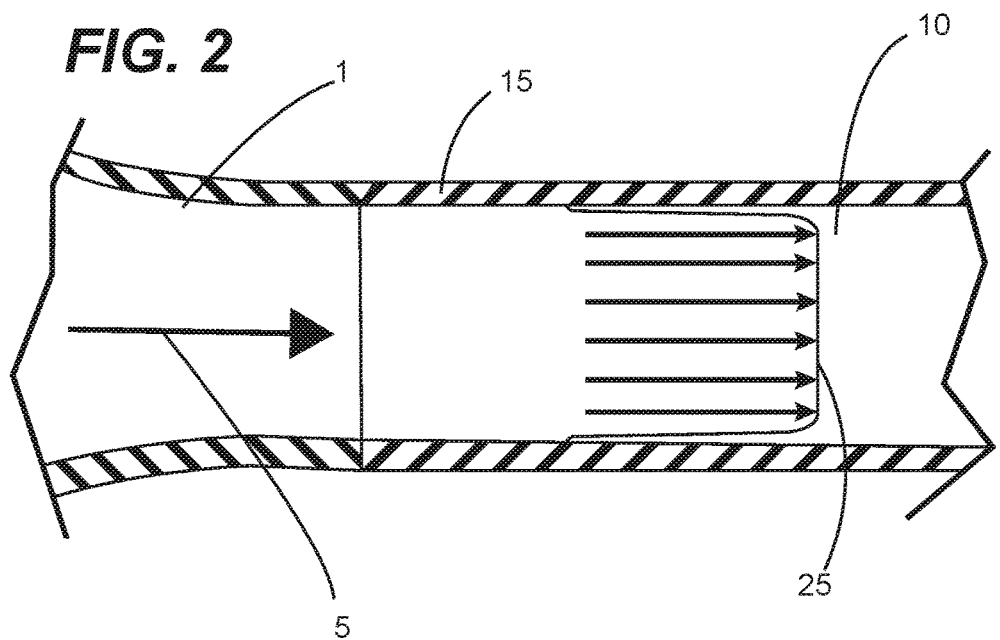
FIG. 2 is a diagrammatic view showing conversion from a laminar flow effect to rotation flow effect by a material flow amplifier configured in accordance with one or more embodiments of the present invention.

As discussed above in reference to FIG. 1, conventional of flowable material 5 within a flow passage 10 of a material flow conduit 15 has a flow profile characterized by laminar flow effect (i.e., laminar flow 20). However, advantageously, material flow amplifier 1 in accordance with one or more embodiments of the present invention is configured in a manner that causes conventional flow to be transformed from a flow profile characterized by laminar flow effect to a flow profile being characterized by cyclonic flow effect (i.e., cyclonic flow 25). Cyclonic flow effect is the result of rotational movement also known as whirlpool movement of the flowable material 5 about the longitudinal axis L1 of the material flow conduit 15 as generated by the material flow amplifier 1. As a person or ordinary skill in the art will understand (e.g., as depicted in FIGS. 1 and 2), cyclonic flow provides greater average flow velocity and volumetric flow than laminar flow for a given material flow conduit. Additionally, cyclonic flow mitigates adverse interaction between the surface of the material flow conduit and the flowable material. These advantageous aspects of cyclonic flow arise from the cyclonic flow profile accelerating and centralizing flow of the flowable material toward the central portion of the flow passage 10, thereby mitigating associated adverse flow conditions and amplifying flow magnitude. The vortex generated in the amplifier also creates a siphoning effect at the inlet creating a "Push-Pull" effect of the fluid. Such cyclonic flow profile generated by the material flow amplifier 1 provides a variety of other advantages as compared to a laminar flow profile (e.g., increased flow rate, reduce inner pipeline wear, more uniform inner pipe wear, reduction in energy consumption, reduced or eliminated slugging and the like).

Generation of the cyclonic flow profile is produced by a siphoning (e.g., push-pull) effect exhibited at an upstream portion of the material flow amplifier 1. The upstream side of the flow amplifier (i.e., upstream of the flow expander) defines its suction side and the downstream side of the output side of the flow amplifier (i.e., downstream of the flow mixer) defines its suction side. The rotational flow creates a siphoning action on the suction side of the material flow amplifier, which can contribute up to about 20% or more of the total flow amplification. The siphoning effect generates material flow momentum, which is beneficial for flowable material transfer. One such beneficial aspect of flowable material transfer is that the volume of fluid transfer is greatly increased because pumping energy is not used to overcome side wall drag associated with laminar flow. In contrast, this pumping energy is advantageously used to generate greater flow velocity and volumetric flow.

As will also become apparent from the disclosures made herein, material flow amplifiers in accordance with embodiments of the present invention advantageously drive flowable material flow toward a focal point along a centerline axis of the material flow conduit. Without this focal point functionality, material flow leaving the flow amplifier would be that of a centrifuge—i.e., material being undesirably accelerated and driven toward the interior surface of the material flow conduit. In contrast, by driving the flowable material toward the centerline axis of the material flow conduit, the amount of flowable material at the interior surface of the material flow conduit is greatly reduced as compared to laminar flow or centrifuge-induced flow. Additionally, by driving flowable material flow toward the focal point of the material flow amplifier, a portion of the flowable material (i.e., generally non-rotating flowable material) becomes trapped between the inside surface of the material flow conduit (e.g., pipeline) and the exterior boundary of the rotationally flowing flowable material, thereby becoming an interface material for the rotationally flowing flowable material that serves to lower the effective coefficient of friction exhibited at the exterior boundary of the rotationally flowing flowable material (i.e., flowing of flowable material upon like material as opposed to material of the material flow conduit).

Accordingly, in view of the material flow being driven toward the centerline axis of the material flow conduit (i.e., toward the focal point of the material flow amplifier), the rotational flow profile provided for by flow amplifiers in accordance with embodiments of the present invention is propagated (e.g., because a large amount of the side wall drag is eliminated) and pipe wear is thus dramatically reduced.

To maintain the beneficial effects of cyclonic flow, one or more additional material flow amplifiers can be provided downstream of an initial material flow amplifier. The distance between amplifiers is proportional to system attributes such as, for example, pipe size, volume of fluid desired flow rates, pipeline's layout, terrain (e.g., elevation grade) and the like. The objective of placement and configuration of the material flow amplifier is to reduce side wall drag, thereby increasing flow and utilizing the full potential of the cross-sectional flow area of a material flow conduit.

In a conventional pipe structure, internal pipe wear occurs unevenly because of the concentration of wear particles scuffing the lowest area of the pipe. In a conventional piping system heavier particle fall out and drag along the bottom of the pipe structure. The vortex action (whirlpool) condition keeps particles suspended. In all flow directional changes such as in elbow pipes, the same particles are thrown to the outside as if it were in a centrifuge. In contrast, cyclonic flow as provided for by material flow amplifiers in accordance with one or more embodiments of the present invention acts as to focus flowable material flow through more uniformly across the centerline and cross-section portion of the of the material flow conduit with less boundary layer contact. Thus, the use of one or more material flow amplifiers in accordance with one or more embodiments of the present invention can mitigate uneven wear and erosion within material flow conduit.

Referring now to FIGS. 3-10, specific aspects of a straight-line material flow amplifier 100 in accordance with one or more embodiments of the present invention are discussed. The straight-line material flow amplifier 100 includes a flow inlet structure 102, a flow expander 104, a vortex flow inducer 106, a flow mixer 108, and a flow outlet structure 110. The flow inlet structure 102, the flow expander 104, the vortex flow inducer 106, the flow mixer 108, and the flow outlet structure 110 are all in fluid communication with each other for forming a fluid flow path therethrough along the longitudinal axis L2 of the straight-line material flow amplifier 100. In preferred embodiments, as shown, the flow inlet structure 102, the flow expander 104, the vortex flow inducer 106, the flow mixer 108, and the flow outlet structure 110 are concentric with each other (e.g., have aligned longitudinal axes and common cross-sectional shapes).

The flow inlet structure 102 includes an upstream portion 112 and a downstream portion 114. In preferred embodiments, the upstream portion 112 and the downstream portion 114 of the flow inlet structure 102 are of the same shape and size. However, in other embodiments, the shape and/or size of the upstream portion 112 and the downstream portion 114 of the flow inlet structure 102 can be different. The flow inlet structure 102 defines a nominal cross-sectional flow area, which can be more specifically defined by dimensional attributes of the upstream portion 112 or the downstream portion 114 of the flow inlet structure 102. For example, where the stream portion 112 and the downstream portion 114 of the flow inlet structure 102 have the same size and shape (e.g., a round shape of a given diameter), the nominal cross-sectional flow area is a circular area of a given among of magnitude.

The flow expander 104 includes an upstream portion 116 and a downstream portion 118. The upstream portion 116 of the flow expander 104 is attached to the downstream portion 114 of the flow inlet structure 102. The downstream portion 118 of the flow expander 104 has a first expanded cross-sectional flow area relative to the nominal cross-sectional flow area. In preferred embodiments, the first expanded cross-sectional flow area of the flow expander 104 is established by the flow expander transitioning from a diameter at its upstream portion 116 that is approximately equal to the diameter of the downstream portion of the flow inlet structure 102 to a diameter that is greater than the diameter of the downstream portion of the flow inlet structure 102.

Jointly, the flow inlet structure 102 and the flow expander 104 form the profile of an inverted funnel (i.e., expanding material flow as opposed to converging it). This inversed funnel profile causes flowable material moving through the flow expander 104 to decelerate thereby exhibiting decreased density. This reduction in velocity and decrease in density causes an associated increase in volume. In this respect, the flow volume is expanded as compared to the flow volume at the upstream portion 116 of the flow expander 104.

The vortex flow inducer 106 includes an exterior tubular body 120, a centralizer tube 122, a plurality of helix vanes 124 and a plurality of helical flow passage 126. The flow inlet structure 102, the flow expander 104, the exterior tubular body 120, the flow mixer 108 and the flow outlet structure 110 jointly define an amplifier body 119. The exterior tubular body 120 includes an upstream portion 126 and a downstream portion 128. The upstream portion 126 of the exterior tubular body 120 is attached to the downstream portion 118 of the flow expander 104. The centralizer tube 122 is located within the exterior tubular body 120 and preferably can have a cross-sectional flow area along an entire length thereof that is about the same as the nominal cross-sectional flow area of the flow inlet structure 102 (e.g., same nominal pipe or tube size). Each of the helix vanes 124 extends along at least a portion of a length of the exterior tubular body 120. All or a portion of an outer edge portion of each of the helix vanes 124 is attached to the exterior tubular body 120 and all or a portion of an inner edge portion of each of the helix vanes 124 is attached to the centralizer tube 122, thereby defining respective ones of the helical flow passage 126. Each of the helix vanes 124 and, thus, each of the helical flow passage 126, includes a material impinging surface 130 oriented at an angle of incidence to the flowable material entering the exterior tubular body 120 from the flow expander 104.

The helix vanes 124 can extend approximately an entire length of the exterior tubular body 120. In some embodiments, a helix vane first end of one or more of the helix vanes 124 can be located adjacent to or within the flow expander 104 and a helix vane second end of one or more of the helix vanes 124 can be located within the vortex chamber 106. In preferred embodiments, the helix vane first end of all of the helix vanes 124 can be located at a position within the exterior tubular body 120 exhibiting at least about 75% of the first expanded cross-sectional flow area of an upstream portion of the exterior tubular body 120 (i.e., the upstream portion of the vortex chamber 106) and a helix vane second end of all of the helix vanes 124 can be located within the vortex chamber 106 proximate a trailing edge of the centralizer tube 122.

The helix vanes 124 each extend helically along a length of the vortex chamber 106. The helix vanes 124 are preferably spaced equidistant from each other but can also be spaced apart from each other in a non-equidistant manner. In one or more embodiments, the helical pitch of each of the helix vanes 124 is such that each of the helix vanes 124 can have an angular rotation of from about 90-degrees to about 360-degrees about the interior of the vortex chamber 106 (e.g., as measured about the longitudinal axis L2 of the straight-line material flow amplifier 100). In one or more other embodiments, the helical pitch of each of the helix vanes 124 is such that each of the helix vanes 124 an have an angular rotation of from about 120-degrees to about 270-degrees about the interior of the vortex chamber 106. In preferred embodiments, each of the helical flow chambers 126 exhibits a reduction in cross-sectional area along its length throughout the spiral wrap creating amplification and acceleration of the fluid. In yet other embodiments, the pitch of each of the helix vanes 124 is such that each of the helix vanes 124 can have an angular rotation in excess of about 360 degrees or in excess of about 540 degrees about the interior of the vortex chamber 106. In general, overall length of the helix vanes 124 and the length and volume of the helical flow passages 126 are proportional to the overall magnitude (i.e., strength) of the cyclonic flow.

The centralizer tube 122 extends at least a portion of the length of the exterior tubular body 120 and has a cross-sectional flow area along an entire length thereof at least about the same as the nominal cross-sectional flow area as defined by the inlet flow structure 102. In one or more embodiments, the centralizer tube 122 and the exterior tubular body 120 can have a common centerline axis, which is the longitudinal axis L2 of the straight-line material flow amplifier 100.

Figure 4:
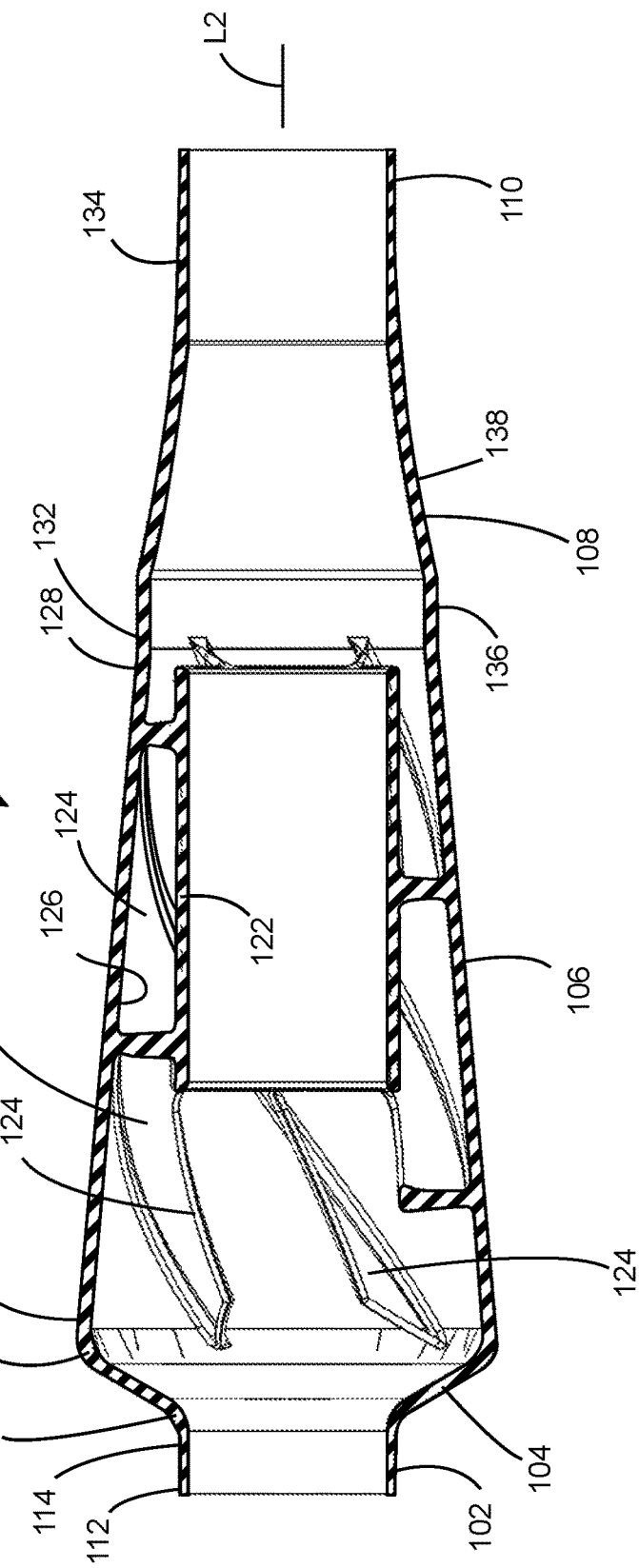
FIG. 4 is a cross-sectional view taken along the line 4-4 in FIG. 3.
Figure 6:
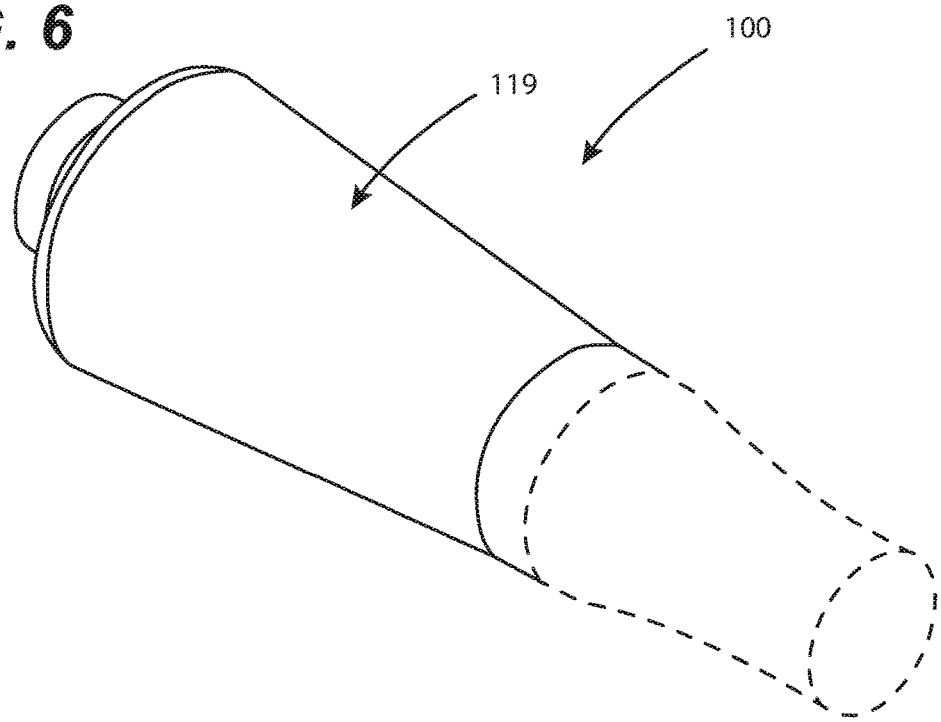
FIG. 6 is a first perspective ornamental view of an amplifier body of the material flow amplifier (i.e., a cyclonic flow includer) shown in FIG. 3, wherein the broken line(s) shown is(are) included for the purpose of illustrating subject matter that can be an unclaimed portion of the ornamental design.
Figure 7:
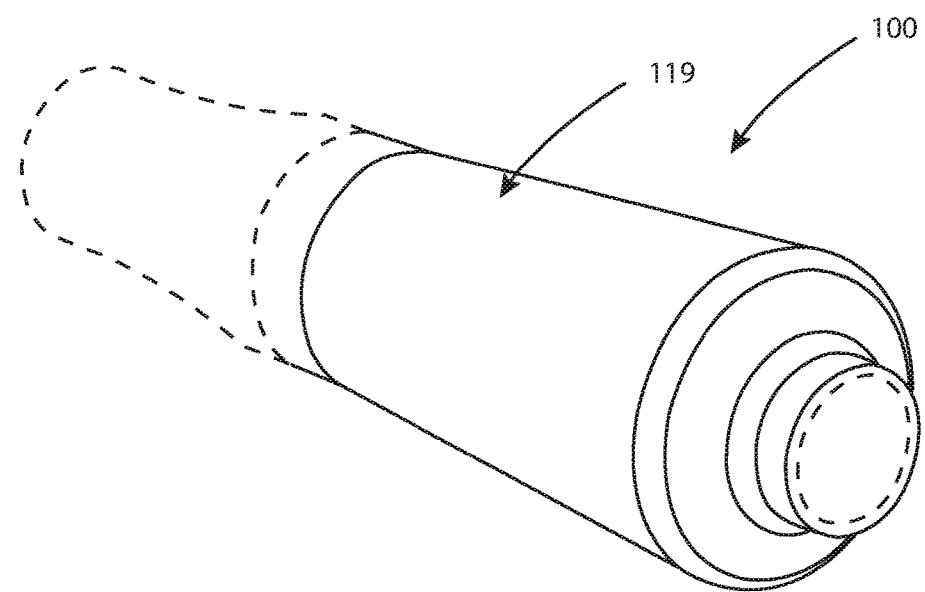
FIG. 7 is second perspective ornamental view of the amplifier body of the material flow amplifier shown in FIG. 3, wherein the broken line(s) shown is(are) included for the purpose of illustrating subject matter that can be an unclaimed portion of the ornamental design.
Figure 8:
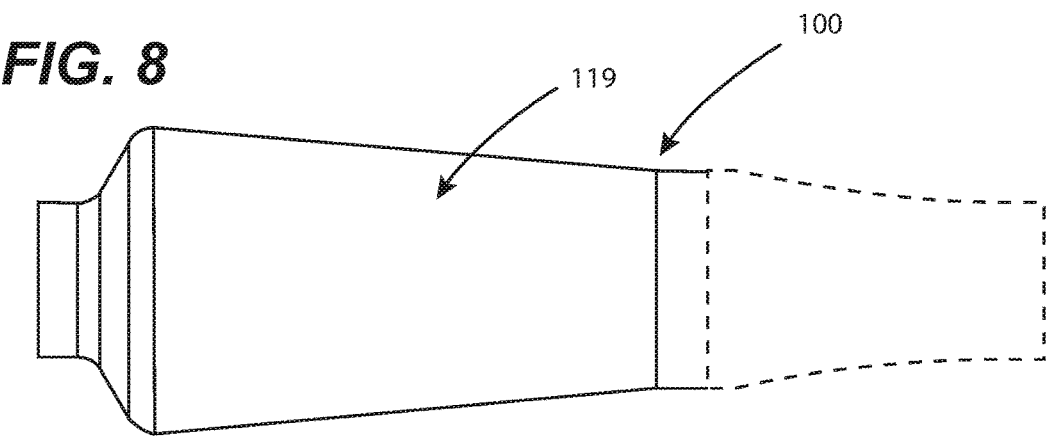
FIG. 8 is a top ornamental view of the amplifier body of the material flow amplifier shown in FIG. 3, wherein bottom, left and right ornamental views are identical to the top view, wherein the broken line(s) shown is(are) included for the purpose of illustrating subject matter that can be an unclaimed portion of the ornamental design.
Figure 9:
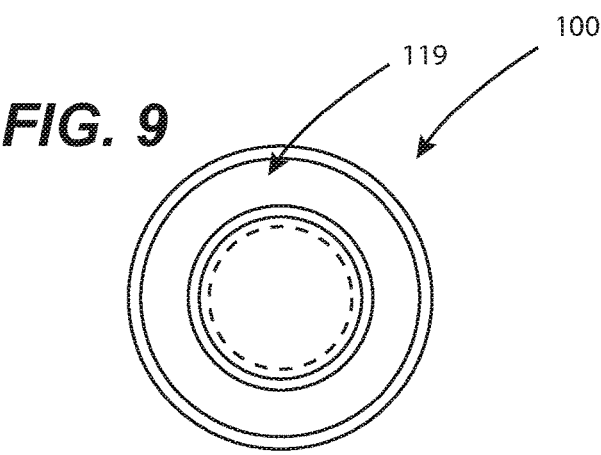
FIG. 9 is a front end ornamental view of the amplifier body of the material flow amplifier shown in FIG. 3, wherein the broken line(s) shown is(are) included for the purpose of illustrating subject matter that can be an unclaimed portion of the ornamental design.
Figure 10:
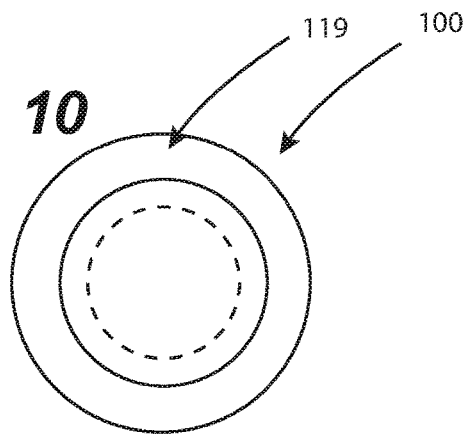
FIG. 10 is a rear end view of the amplifier body of the material flow amplifier shown in FIG. 3, wherein the broken line(s) shown is(are) included for the purpose of illustrating subject matter that can be an unclaimed portion of the ornamental design.

In a preferred embodiment, as shown in FIG. 4, the centralizer tube 122 and helix vanes 124 have respective lengths such that a leading edge of the centralizer tube 122 is spaced away from the downstream portion 116 of the flow expander 104, the helix vane first end of one or more of the helix vanes 124 is located adjacent to or within the flow expander 104 and the helix vane second end of all of the helix vanes 124 and the trailing edge of the centralizer tube 122 are located adjacent to or slightly within the flow expander 104. This relationship is desirable as it permits flowable material entering the vortex flow inducer 106 from the flow expander 104 to follow a path of least resistance either into the centralizer tube 122 or along the material impinging surface 130 of one of the helix vanes 124 and into the respective one of the helical flow passage 126 and permits these individual flows of flowable material to enter the flow mixer 108 with minimal mixing therebetween within the vortex chamber 106. Preferably, the exterior tubular body 120, the centralizer tube 122 and the helix vanes 124 are jointly configured (e.g., length of the vortex chamber, taper of the vortex chamber, length of the centralizer tube, location of leading edge of centralizer tube, pitch and length of helix vanes, surface area of helix vanes, and volume of material flow passages) such that at least about 65% of the flowable material entering the vortex chamber 106 flows in aggregate through the helical flow passages 126 with the remainder of such flowable material flowing through the centralizer tube 122.

Still referring to the relationship between the exterior tubular body 120, the centralizer tube 122 and the helix vanes 124, in one or more embodiments, the helix vane first end of all of the helix vanes 124 is located at a position within the exterior tubular body 120 exhibiting at least about 75% of the first expanded cross-sectional flow area of an upstream portion of the exterior tubular body 120, each of the helix vanes 124 extends along at least about 60% an entire length of the vortex chamber 106 with an angular rotation of from about 90-degrees to about 360-degrees about the interior of the exterior tubular body 120, the centralizer tube 122 has a length of at least about 40% the length of the helix vanes 124, the centralizer tube 122 has a cross-sectional flow area along an entire length thereof that is not less than the nominal cross-sectional flow area of the flow inlet structure 102, and both the centralizer tube 122 and all of the helix vanes 124 (e.g., inner edges thereof) terminate within the exterior tubular body 120. In preferred embodiments, the helix vane first end of all of the helix vanes 124 is located at a position within the exterior tubular body 120 exhibiting at least about 90% of the first expanded cross-sectional flow area of an upstream portion of the exterior tubular body 120, each of the helix vanes 124 extends along at least about 80% an entire length of the exterior tubular body 120 with an angular rotation of from about 120-degrees to about 270-degrees about the interior of the exterior tubular body 120, the centralizer tube 122 has a length of about 50% to about 75% the length of the helix vanes 124, the centralizer tube 122 has a cross-sectional flow area along an entire length thereof that is about the same as the nominal cross-sectional flow area of the flow inlet structure 102, and both the centralizer tube 122 and all of the helix vanes 124 terminate within the exterior tubular body 120.

Thus, material flow amplifiers in accordance with one or more embodiments of the present invention advantageously provide for generation of material flow having cyclonic flow. Though use of helical helix vanes arranged (e.g., sized and equidistantly spaced) to provide helical flow passage that are enclosed (e.g., sidewalls defined by exterior tubular body, the centralizer tube and adjacent helix vanes) and that are preferably equal in size and volume, resulting cyclonic flow of flowable material flowing through a material flow amplifiers in accordance with one or more embodiments of the present invention is controlled and balanced. In contrast to material flow amplifiers that do not include enclosed helical flow passages, material flow amplifiers in accordance with one or more embodiments of the present invention exhibit negligible or no overflow or other flow interaction of flowable material from one helical flow space to another. This isolation of flow mitigates flow imbalances that can cause flow disturbances resulting in adverse flow conditions (e.g., vibrations in material flow conduit, pulsations in material flow, eddy currents in material flow, etc.), which can induce structural damage and limit material flow efficiency.

The flow mixer 108 includes an upstream portion 132 and a downstream portion 134. The upstream portion 132 of the flow mixer 108 is attached to the downstream portion 128 of the exterior tubular body 120. The upstream portion 132 of the flow mixer 108 has a second expanded cross-sectional flow area that is smaller than the first expanded cross-sectional flow area of the flow expander 104. The minimum cross-sectional flow area of the exterior tubular body 120 is generally located at the point of attachment of the upstream portion 132 of the flow mixer 108 to the downstream portion 128 of the exterior tubular body 120, whereby the second expanded cross-sectional flow area is generally the same as the minimum cross-sectional flow area of the exterior tubular body 120. Accordingly, in preferred embodiments where the exterior tubular body 120 has a round cross-sectional shape, the second expanded cross-sectional flow area being smaller than the first expanded cross-sectional flow area corresponds to the exterior tubular body 120 being conically shaped and the helical flow passages 126 being tapered along their length (i.e., wider upstream and narrower downstream).

Figure 3:
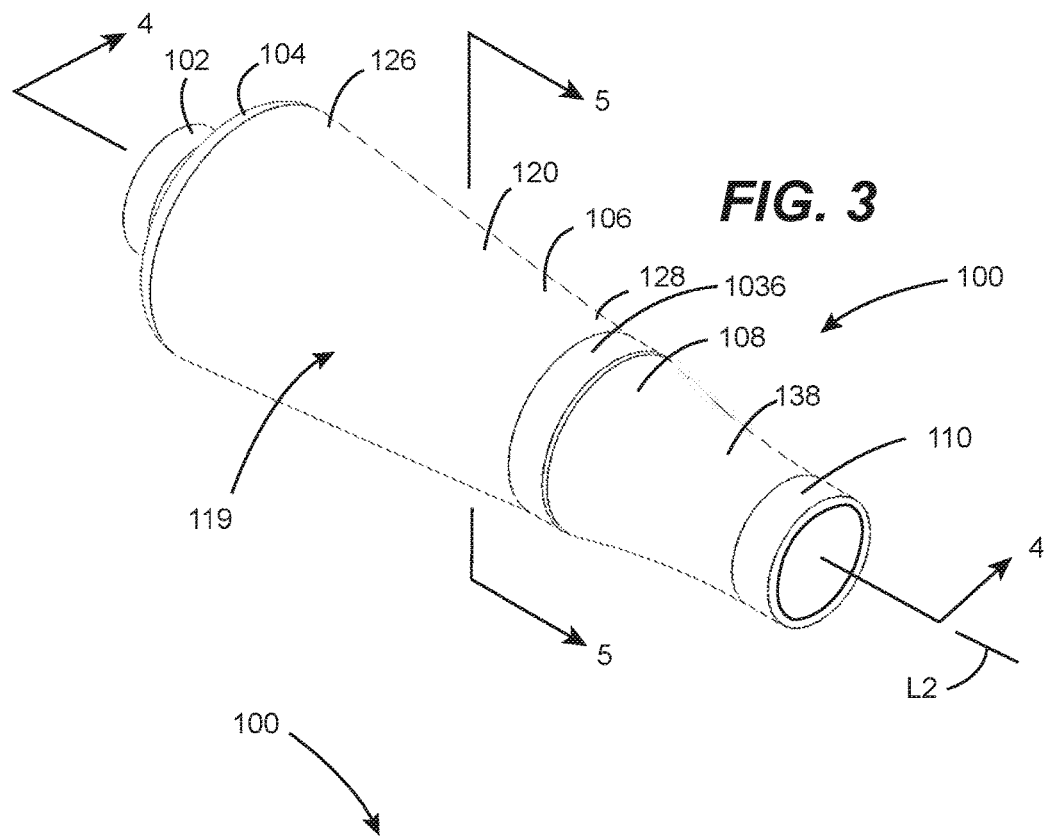
FIG. 3 is a perspective view of a straight-line material flow amplifier configured in accordance with one or more embodiments of the present invention.
Figure 5:
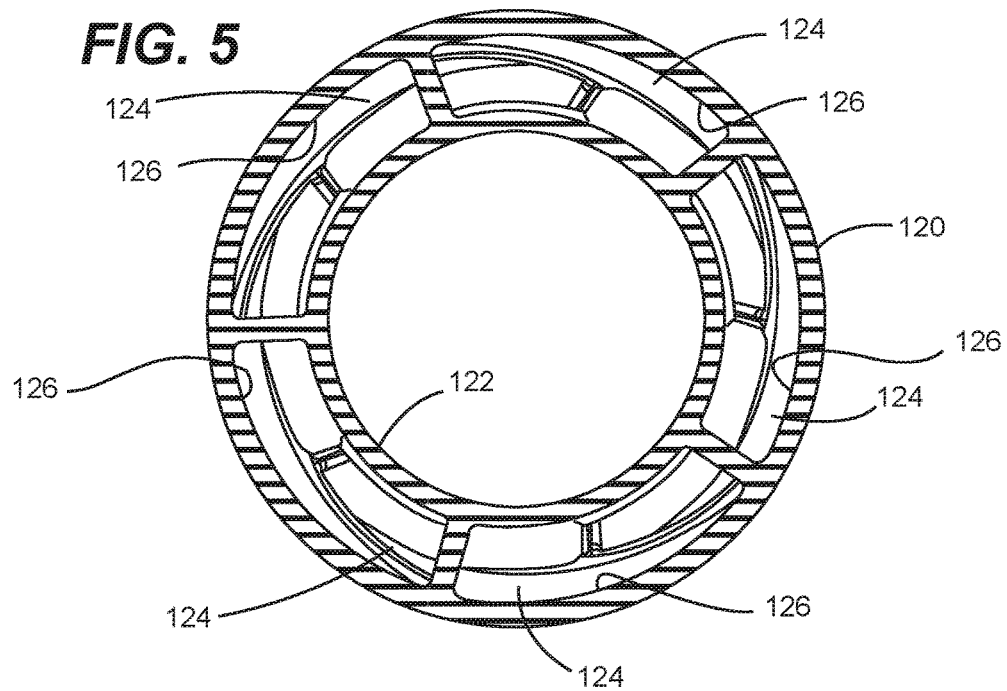
FIG. 5 is a cross-sectional view taken along the line 5-5 in FIG. 3.

As shown in FIGS. 3 and 4, in preferred embodiments, the flow mixer 108 preferably can include a cylindrical portion 136 that defines the upstream portion 132 of the flow mixer 108 and a convergent portion 138 that defines the downstream portion 134 of the flow mixer 108. The convergent portion 138 can have an inwardly curved sidewall profile (e.g., parabolic-shaped) or a straight-taper sidewall profile. The cylindrical portion 136 extends for a portion of the overall length of the flow mixer 108 and the convergent portion 138 can extend for a remaining portion of the overall length of the flow mixer 108. In some embodiments, the cylindrical portion 136 can be omitted such that the flow mixer 108 consists entirely of the convergent portion 138.

The flow mixer 108 provides a volumetric space in which material flow through the helical flow passages 126 and the centralizer tube 122 can merge together. In contrast to material flow amplifiers with a flow mixer that does not include a cylindrical portion, the cylindrical portion 136 of the flow mixer 108 of material flow amplifiers in accordance with one or more embodiments of the present invention (e.g., straight-line material flow amplifier 100) provides a volumetric space in which the merging flows of material from the vortex flow inducer 106 are able to merge prior to being subjected to convergent compression by the convergent portion 138 of the flow mixer 108. The tapered profile of convergent portion 138 of the flow mixer 108 creates a focal point of the cyclonic flow of the flowable material. In preferred embodiments, the focal point of the cyclonic flow of the flowable material is located prior to the flow outlet structure 110. Accordingly, in view of the disclosures made herein, a person of ordinary skill in the art will understand that the duration of strength of the cyclonic flow downstream of the material flow amplifier is defined by dimensional and structural attributes of the flow expander 104, the vortex inducer 106 and the flow mixer 108.

The flow outlet structure 110 includes an upstream portion 140 and a downstream portion 142. In preferred embodiments, the upstream portion 140 and the downstream portion 142 of the flow outlet structure 110 are of the same shape and size and can have the same or about same cross-sectional flow area as the inlet flow structure 102 (e.g., the nominal cross-sectional flow area). However, in other embodiments, the shape and/or size of the upstream portion 140 and the downstream portion 142 of the flow outlet structure 110 can be different.

Material flow amplifiers in accordance with one or more embodiments of the present invention can have a vortex chamber with a centerline axis that is curved (i.e., elbow material flow amplifiers). The centerline axis of the vortex chamber and its side walls are curved and profiled in compound angles. Such curved centerline axis provides a material flow amplifier in the form commonly referred to as a "pipe elbow". Pipe elbows are well known to have curvature or from as little as about 15-degrees from straight to as much as 90-degrees from straight. It is also well known that conventional pipe elbows exhibit unbalanced flow. As flowable material is directed around the curvature of the pipe elbow, centrifugal force pushes the flowable material toward the outside radius of the pipe elbow, thereby causing flow resistance, friction, and premature pipe wall wear. Advantageously, the structure of the elbow material flow amplifiers configured in accordance with one or more embodiments of the present invention serves to promote cyclonic flow therethrough and thus balanced fluid flow therethrough (i.e., flow uniformly along the centerline axis).

Figure 11:
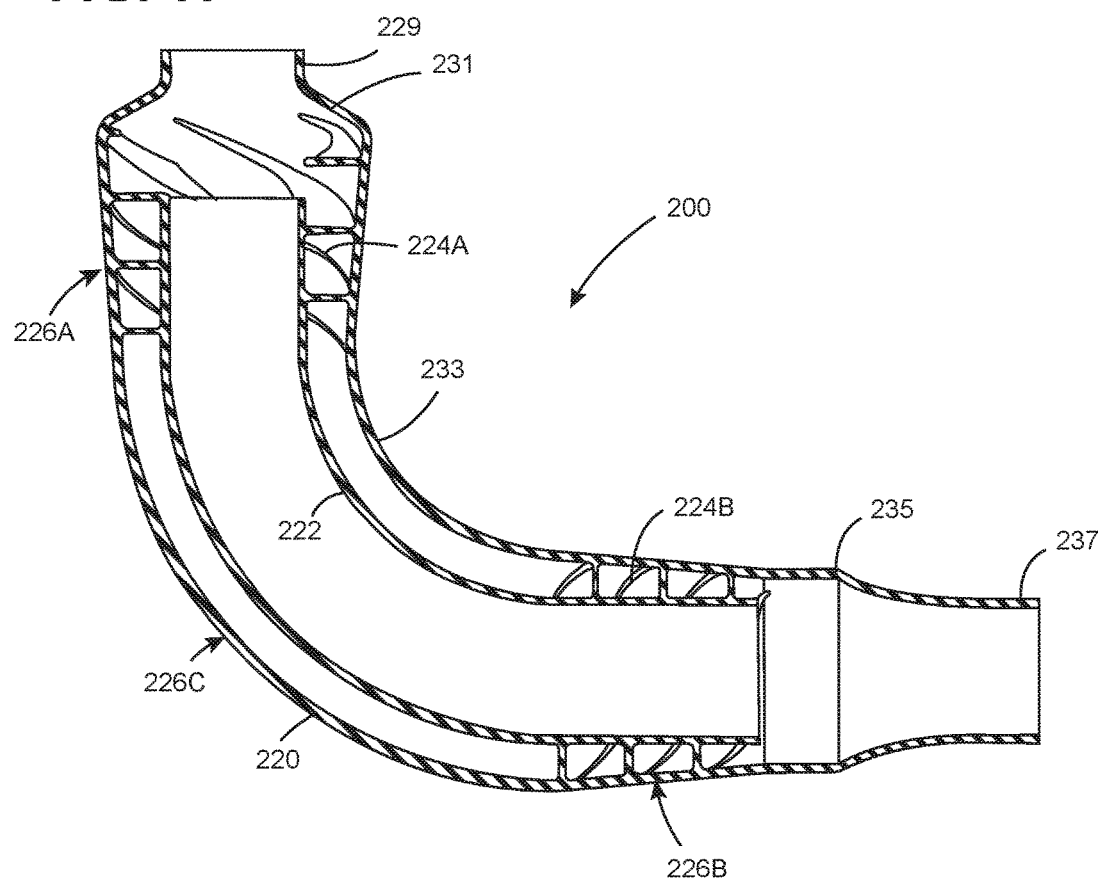
FIG. 11 is a cross-sectional view showing an elbow material flow amplifier configured in accordance with one or more embodiments of the present invention.

An elbow material flow amplifier 200 in accordance with an embodiment of the present invention is shown in FIG. 11. As shown, the elbow material flow amplifier 200 has an overall construction similar to that of the straight-line material flow amplifier 100 discussed above in reference to FIGS. 3-10. The aspects of the elbow material flow amplifier 200 that are notably different than that of the straight-line material flow amplifier 100 are discussed.

The elbow material flow amplifier 200 provides an amplifier body that includes a plurality of amplifier segments—an inlet section 229, a flow expander section 231, a vortex inducer section 233, a flow mixer section 235 and a flow outlet section 237. Jointly, each of these sections 229-237 provides the same function as a corresponding section of the straight-line material flow amplifier 100 discussed above in reference to FIGS. 3-10. As shown, the vortex inducer section 233 can have a first helix vane segment 224A that extends from proximate the flow expander section 231 and terminate proximate a location where curvature of a centralizer tube 222 of the vortex inducer section 233 begins and can have a second helix vane segment 224B that extends from proximate a location where curvature of the centralizer tube 222 of the vortex inducer section 233 ends and terminates proximate the flow mixer section 235. An exterior tubular body 220 of the vortex inducer section 233, the first helix vane segment 224A, the second helix vane segment 224B and the centralizer tube 222 can jointly define upstream helical flow passages 226A, downstream helical flow passages 226B and an intermediate flow passage 226C extending therebetween. Preferably, intermediate flow passage 226C has no vanes or other internal structure and maintains a uniform cross-sectional area along its length, thereby allowing rotational flow from within the upstream helical flow passages 226A to continue in an unrestricted manner within the intermediate flow passage 226C. In this respect, the helix vanes 224A, 224B and the helical flow passages 226A, 226B, 226C extend intermittently along the length of the exterior tubular body 220. In one or more other embodiments, a length of the intermediate flow passage 226C can be substantially longer than shown, a length of the intermediate flow passage 226C can be substantially shorter than shown, the intermediate flow passage 226C can have a decreasing cross sectional area along its length, and/or the intermediate flow passage 226C can be omitted such that one or more helical flow passages extend contiguously along at least a portion of the length of the centralizer tube 222.

As shown, the centralizer tube 222 terminates at a location after the curvature of the centralizer tube 222 ends. Such configuration provides for the downstream helical flow passages 226B to be linear as opposed to having curvature. The linear portion of the downstream helical flow passages 226B (or downstream portion of contiguous helical flow passages) utilizes natural centrifuge force of material flowing through the curved portion of the vortex inducer section 233 to further promote rotational flow In preferred embodiments, a length of such linear portion of the downstream helical flow passages 226B (or downstream portion of contiguous helical flow passages) is at least about 10% a length of the curved portion of the centralizer tube 222 (as measure along the centerline thereof) and is preferably at least about 25% the length of the curved portion of the centralizer tube 222.

Material flow amplifiers in accordance with embodiments of the present invention can be fabricated utilizing various known and yet to be discovered materials and fabrication techniques. Examples of useful material classes include, but are not limited to, metallic material (e.g., metal alloys), concrete (i.e., a cement-based material), and polymeric materials (e.g., plastics). Examples of useful fabrication techniques include, but are not limited to, casting forging, welding and the like for metallic materials and casting, molding, 3-D printing and the like for polymeric materials.

Figure 12:
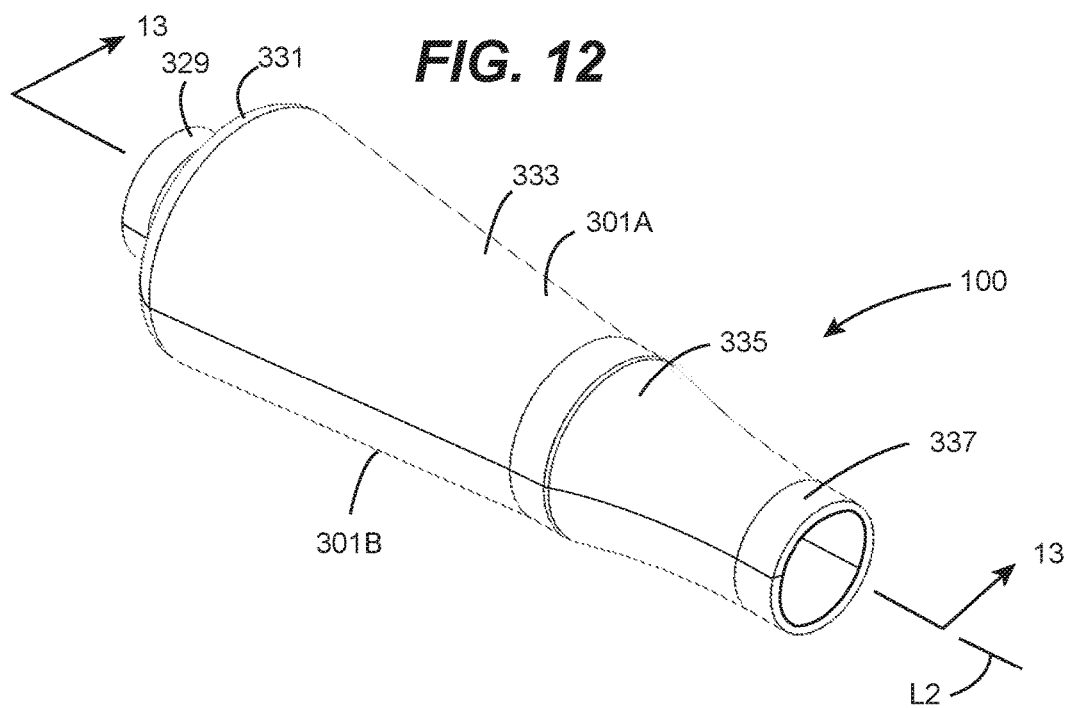
FIG. 12 is a bottom perspective view showing the guide body lock of the implanted article physical referencing apparatus of FIG. 1.
Figure 13:
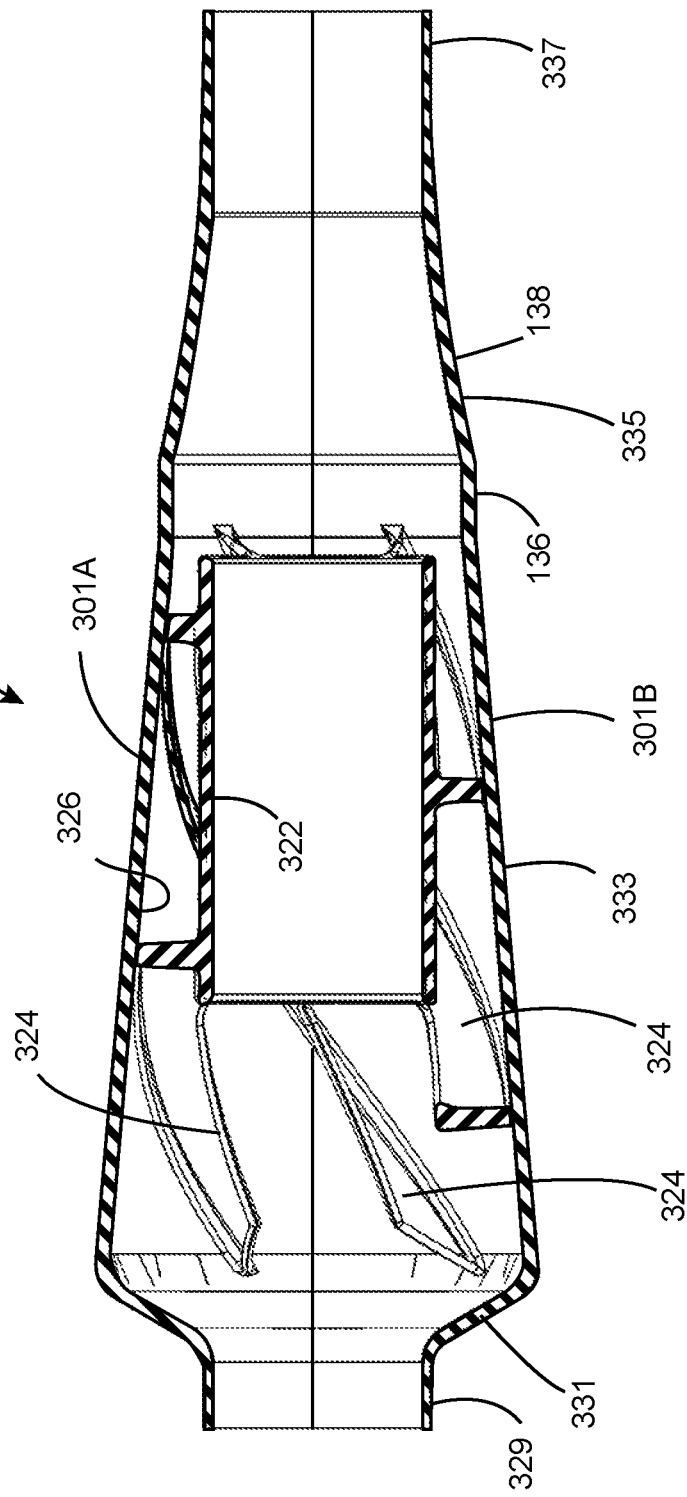
FIG. 13 is a cross-sectional view taken along the line 13-13 in FIG. 12.

In one specific implementation of a fabrication technique, as shown in FIGS. 12-13, a material flow amplifier in accordance with one or more embodiments of the present invention can have a "clamshell" configuration (i.e., clamshell material flow amplifier 300). As shown, the clamshell material flow amplifier 300 has an overall construction similar to that of the straight-line material flow amplifier 100 discussed above in reference to FIGS. 3-10. The aspects of the clamshell material flow amplifier 300 that are notably different than that of the straight-line material flow amplifier 100 are discussed. It is also disclosed herein that such clamshell configuration is equally applicable to conventional material flow amplifiers (e.g., those that do not include a centralizer tube).

The clamshell material flow amplifier 300 includes opposing amplifier bodies 301A, 301B. The amplifier bodies 301A, 301B jointly define an amplifier body within which a centralizer tube 322, a plurality of helix vanes 324 and helical flow passages 326 (or a single helix vane and corresponding single helical flow passage). The amplifier body includes a plurality of amplifier segments—an inlet section 329, a flow expander section 331, a vortex inducer section 333, a flow mixer section 335 and a flow outlet section 337. Jointly, each of these sections 329-337 provides the same function as a corresponding section of the straight-line material flow amplifier 100 discussed above in reference to FIGS. 3-10.

Advantageously, the clamshell material flow amplifier 300 decouples fabrication of the amplifier body from internal components disposed therein. The amplifier bodies 301A, 301B can be fabricated by any suitable fabrication technique (e.g., casting, forging, hydroforming, machining, 3-D printing or the like) and from any suitable material (e.g., metallic material, polymeric material ceramic material or the like). Separately, from any suitable material (e.g., metallic material, polymeric material ceramic material or the like), each of the internal components can be independently fabricated using a respective suitable fabrication technique (e.g., shaping, casting, forging, hydro-forming, machining, 3-D printing or the like) and then assembled (e.g., via welding, bonding or the like) to form an vortex chamber insert 339 comprising the centralizer tube 322 and the helix vanes 324 to produce a vortex chamber insert 339. Alternatively, the vortex chamber insert 339 can be formed in a one-piece manner using by any suitable fabrication technique (e.g., casting, forging, hydroforming, machining, 3-D printing or the like) and from any suitable material (e.g., metallic material, polymeric material ceramic material or the like).

The vortex chamber insert 339 is disposed within an interior space of a first one of the amplifier bodies (e.g., amplifier body 301A) and a second one of the amplifier bodies (e.g., amplifier body 301B) is then placed into mating engagement with the first one of the amplifier bodies. Thus, the internal configuration of the clamshell material flow amplifier 300 can be generally the same as a material flow amplifier having a one-piece construction (e.g., cast construction) as shown and discussed above in reference to the straight-line material flow amplifier 100 of FIGS. 3-10. The amplifier bodies 301A, 301B can then be permanently attached to each other such as by, for example, welding, ultrasonic bonding, adhesive, or the like. Optionally, to prevent or limit relative movement therebetween, the vortex chamber insert 339 can be secured to at least one of the amplifier bodies 301A, 301B by a suitable technique (e.g., the same technique as used to attach the amplifier bodies to each other. In one or more embodiments, all or a portion of an outer edge of one or more of the helix vanes 324 can be attached to at least one of the amplifier bodies 301A, 301B (e.g., via continuous or tack welding directly or through access windows in the In yet another fabrication approach, all or segments of each of the helix vanes 324 can be formed in conjunction with a respective one of the amplifier bodies 301A, 301B and the centralizer tube placed within a centralizer tube receiving space defined by the helix vane(s) after engaging the amplifier bodies 301A, 301B with each other. All or a portion of an inner edge of one or more of the helix vanes 324 can be attached to the centralizer tube 322 (e.g., via continuous or tack welding, via bonding material such as adhesive, or the like).

Discussed now are various advantageous aspects of material flow amplifiers in accordance with embodiments of the present invention. One such advantageous aspect is that the incorporation of the centralizer tube and resulting helical flow passages provide for cyclonic flow. Such cyclonic flow is characterized by a "top end" or head that is generated by the flow expander and upstream portion of the vortex chamber and by omnidirectional flow (i.e., generally equal flow in all directions perpendicular to the axis of rotation). Each of the helical flow passages then uses the kinetic energy (i.e., energy from motion) and the flow's velocity to generate several stream vanes of material flow (i.e., helical low streams) that unite in the flow mixer with each other and with the material flow of a centralized flow stream (i.e., flow of the centralizer tube). These material flows are then focused by the flow mixer to the centerline of the material flow amplifier, thereby forming the "tail end" of the cyclonic flow. Beneficially, the flow mixer further enhances cyclonic flow and distributes an even (i.e., balanced) cyclonic flow profile about the centerline of the material flow amplifier. Advantageously, inner sidewall conditions of material flow conduit (e.g., pipeline) downstream of a material flow amplifier has a negligible effect on the cyclonic flow. Although there is a great deal of energy loss from a fluid going through certain disruptive material flow attributes of material flow conduits (e.g., a valve, fitting, or turbulence created going from passing fluid from one pipe size to another), cyclonic flow mitigates energy loss from these disruptive material flow attributes of material flow conduits by providing for concentration of material flow along the centerline of material flow conduit downstream of the material flow amplifier thereby reducing sidewall drag and flow resistance.

Another advantageous aspect of material flow amplifiers in accordance with one or more embodiments of the present invention is providing for "soft reverse flow". With such soft reverse flow, if there is ever a back flow surge in a system comprising one or more material flow amplifiers in accordance with one or more embodiments of the present invention, the material flow amplifier serves to reduce the backflow (i.e., flow in the upstream direction) by at least about 50% as compared to the material flow amplifier being absent. Such soft reverse flow beneficially does not fully inhibit backflow, which would create a shock wave that is harmful to the structures of the material flow conduit, and to the pumping devices. In a gravity flow system this is especially beneficial where tide water or flooding could reverse flow in a conventional pipeline system. More specifically, in a reverse flow scenario, flowable material enters the helical flow passages from the flow mixer and then dead heads into the 'funnel' of the flow expander, which creates a controlled flow blockage (i.e., controlled funnel flow). In this regard, soft reverse flow is enabled by inclusion of material flow passages defined between the exterior tubular body and the centralizer tube.

Still another advantageous aspect of material flow amplifiers in accordance with embodiments of the present invention is that they are fully "piggable", as required by the certified in accordance the American Petroleum Institute API-570 inspection process. The oil and petroleum industry require components of pipeline structures to be piggable, which is a process that includes but is not limited to cleaning and inspection of the pipeline interior by deploying a "pigging device" that travels within the pipeline. To this end, material flow amplifiers in accordance with embodiments of the present invention permit the pigging device to travel non-obtrusively therethrough regardless of the types of sections that the pipeline includes (e.g., straight line, short radius elbows, long radius elbows, 'Y' fittings, laterals, ellipse, and semi-ellipse cross sections of the pipeline).

The pigging device has an elongated body with a perimeter seal at each of its ends. The perimeter seals have a size whereby they maintain engagement with an inside diameter of a material flow conduit (e.g., pipeline) to support a pressure drop across the length of the pigging device. It is this pressure drop that serves to propel the pigging device along then length of the material flow conduit. This being the case, material flow amplifiers in accordance with embodiments of the present invention are configured to maintain engagement between at least one of the perimeter seals and the inside diameter of a material flow conduit and/or material flow amplifier. More specifically, the length of the centralizer tube of material flow amplifiers in accordance with embodiments of the present invention has a length that provides for such seal with the pigging device as it enters and leaves the material flow amplifier. As the pigging device passes through the material flow amplifier, at least one of the perimeter seals is either within portion of the material flow conduit upstream or downstream of the material flow amplifier or is within the centralizer tube. In some embodiments, the flow inlet structure and/or flow outlet structure can be configured to provide for such seal with the pigging device as it enters and/or leaves the material flow amplifier.

Material flow amplifiers in accordance with embodiments of the present invention can be fitted with flow monitor that can be viewed remotely. Regardless of whether the material flow amplifier is subsurface or above ground, the flow monitor can include one or more monitoring devices (e.g., each mounted within a respective portion of an amplifier body of the material flow amplifier) and data can be provided therefrom for continuous viewing.

Material flow amplifiers in accordance with embodiments of the present invention are useful in a variety of pipeline components such as, for example, straight-line components, elbow components, reducing laterals, tees and the like. Material flow amplifiers in accordance with embodiments of the present invention can be installed as a fitting, retrofitted to a section of pipe, or installed into a working pipeline in sections. Material flow amplifiers in accordance with embodiments of the present invention can be used in any right-hand or left-hand flow angles which also includes vertical up and vertical down applications. Material flow amplifiers in accordance with embodiments of the present invention can be used for a variety of flowable materials (e.g., fluid, liquid, slurry and the like) and in transfer systems of a variety of sizes (e.g., from about 2" (5.08 cm) to about 16' (4.877 meters) or more in diameter.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A material flow amplifier, comprising:
   an amplifier body having a flow expander, a vortex chamber and, a flow mixer all in fluid communication with each other for forming a fluid flow path therethrough, wherein the vortex chamber extends from the flow expander and wherein the flow mixer extends from the vortex chamber wherein the flow expander, the vortex chamber and the flow mixer are all concentric with each other and wherein a centerline axis of the vortex chamber is curved;
   at least one helix vane within the vortex chamber extending at least intermittently from a helix vane first end proximate the flow expander to a helix vane second end proximate the flow mixer, wherein at least a portion of an outer edge portion of the at least one helix vane is attached to an interior surface of the amplifier body within the vortex chamber; and
   a centralizer tube within the amplifier body extending at least a portion of the length of the vortex chamber, wherein at least a portion of an inner edge portion of the at least one helix vane is attached to an exterior surface of the centralizer tube.

2. The material flow amplifier of claim 1 wherein:
   the centralizer tube terminates proximate the flow mixer;
   a length of the centralizer tube is less than a length of the vortex chamber;
   the flow mixer includes a cylindrical portion extending from the vortex chamber;
   the flow mixer includes a convergent portion extending from the cylindrical portion; and
   the convergent portion of the flow mixer has one of a curved sidewall profile and a straight-taper sidewall profile.

3. The material flow amplifier of claim 2 wherein:
   the helix vane first end of said at least one helix vane is located at a position within the vortex chamber exhibiting at least about 75% of a first expanded cross-sectional flow area of an upstream portion of the vortex chamber; and
   the helix vane second end of one or more of the helix vanes is located within the vortex chamber.

4. A material flow amplifier, comprising:
   an amplifier body having a flow expander, a vortex chamber and, a flow mixer all in fluid communication with each other for forming a fluid flow path therethrough, wherein the vortex chamber extends from the flow expander and wherein the flow mixer extends from the vortex chamber;
   at least one helix vane within the vortex chamber extending at least intermittently from a helix vane first end proximate the flow expander to a helix vane second end proximate the flow mixer, wherein at least a portion of an outer edge portion of the at least one helix vane is attached to an interior surface of the amplifier body within the vortex chamber; and
   a centralizer tube within the amplifier body extending at least a portion of the length of the vortex chamber, wherein at least a portion of an inner edge portion of the at least one helix vane is attached to an exterior surface of the centralizer tube, wherein the centralizer tube terminates proximate the flow mixer and wherein a length of the centralizer tube is less than a length of the vortex chamber.

5. The material flow amplifier of claim 4 wherein a plurality of helix vanes within the vortex chamber each extend from a helix vane first end proximate the flow expander to a helix vane second end proximate the flow mixer.

6. The material flow amplifier of claim 5 wherein the helix vane first end of one or more of the helix vanes is located at a position within the vortex chamber exhibiting at least about 75% of a first expanded cross-sectional flow area of an upstream portion of the vortex chamber.

7. The material flow amplifier of claim 6 wherein the helix vane second end of one or more of the helix vanes is located within the vortex chamber.

8. The material flow amplifier of claim 4 wherein the centralizer tube has a cross-sectional flow area along an entire length thereof at least about the same as a cross-sectional flow area of a flow inlet structure connected to an inlet portion of the flow expander.

9. The elbow flow amplifier of claim 4 wherein:
an upstream portion of the vortex chamber has a first expanded cross-sectional flow area; and
a downstream portion of the vortex chamber has a second expanded cross-sectional flow area smaller than the first expanded cross-sectional flow area.

10. The material flow amplifier of claim 4 wherein the flow mixer includes a cylindrical portion extending from the vortex chamber.

11. The material flow amplifier of claim 10 wherein the flow mixer includes a convergent portion extending from the cylindrical portion.

12. The material flow amplifier of claim 11 wherein the convergent portion has one of a curved sidewall profile and a straight-taper sidewall profile.

13. The material flow amplifier of claim 11 wherein the convergent portion has one of a curved sidewall profile and a straight-taper sidewall profile.

14. An elbow flow amplifier, comprising:
an amplifier body having a flow inlet structure, a flow expander, a curved vortex chamber, a flow mixer and a flow outlet structure all in fluid communication with each other for forming a fluid flow path therethrough, wherein the flow expander extends from the flow inlet structure, wherein the vortex chamber extends from the flow expander, wherein the flow mixer extends from the vortex chamber and wherein the flow outlet structure extends from the flow mixer;
a plurality of helix vanes within the vortex chamber extending at least partially from a helix vane first end proximate the flow expander to a helix vane second end proximate the flow mixer, wherein an outer edge portion of each of the helix vanes is attached to an interior surface of the amplifier body within the vortex chamber and wherein each of the helix vanes includes a material impinging surface oriented at an angle of incidence to the flowable material entering the vortex chamber from the flow expander; and
a curved centralizer tube within the amplifier body extending at least a portion of the length of the curved vortex chamber, wherein an inner edge portion of each of the helix vanes is attached to an exterior surface of the curved centralizer tube and wherein a centerline axis of the curved centralizer tube extends along a centerline axis of the curved vortex chamber.

15. The elbow flow amplifier of claim 14 wherein the helix vane first end of one or more of the helix vanes is located at a position within the vortex chamber exhibiting at least about 75% of a first expanded cross-sectional flow area of an upstream portion of the vortex chamber.

16. The elbow flow amplifier of claim 14 wherein the centralizer tube has a cross-sectional flow area along an entire length thereof at least about the same as a nominal cross-sectional flow area of the flow inlet structure.

17. The elbow flow amplifier of claim 14 wherein the flow inlet structure, the flow expander, the vortex chamber, the flow mixer and the flow outlet structure are all concentric with each other.

18. The elbow flow amplifier of claim 14 wherein:
the centralizer tube terminates proximate the flow mixer;
a length of the centralizer tube is less than a length of the vortex chamber;
the flow mixer includes a cylindrical portion extending from the vortex chamber;
the flow mixer includes a convergent portion extending from the cylindrical portion; and
the convergent portion of the flow mixer has one of a curved sidewall profile and a straight-taper sidewall profile.

19. The elbow flow amplifier of claim 14 wherein:
an upstream portion of the vortex chamber has a first expanded cross-sectional flow area; and
a downstream portion of the vortex chamber has a second expanded cross-sectional flow area smaller than the first expanded cross-sectional flow area.

20. A material flow amplifier, comprising:
a flow inlet structure with a downstream portion thereof having a nominal cross-sectional flow area;
a flow expander with an upstream portion thereof attached to and concentric with the downstream portion of the flow inlet structure, wherein the flow expander has a downstream portion thereof having a first expanded cross-sectional flow area relative to the nominal cross-sectional flow area;
a vortex flow inducer comprises an exterior tubular body, a centralizer tube, and at least one at least one helical flow passage, wherein an upstream portion of the exterior tubular body is attached to and concentric with a downstream portion of the flow expander, wherein the centralizer tube extends at least a portion of the length of the exterior tubular body and wherein the at least one helical flow passage extends between the exterior tubular body and the centralizer tube and extends at least partially along a length of the centralizer tube, wherein a centerline axis of the centralizer tube extends along a centerline axis of the exterior tubular body, wherein the centralizer tube has a cross-sectional flow area along an entire length thereof at least about the same as the nominal cross-sectional flow area terminates proximate the flow mixer and has a length of the centralizer tube is less than a length of the vortex chamber;
a flow mixer with an upstream portion thereof having a second expanded cross-sectional flow area attached to and concentric with a downstream portion of the exterior tubular body, wherein the second expanded cross-sectional flow area is smaller than the first expanded cross-sectional flow area, wherein at least the upstream portion of the flow mixer is cylindrical; wherein the flow mixer includes a cylindrical portion extending from the vortex chamber, wherein the flow mixer includes a convergent portion extending from the cylindrical portion and wherein the convergent portion has one of a curved sidewall profile and a straight-taper sidewall profile; and
a flow outlet structure with an upstream portion thereof attached to and concentric with a downstream portion of the flow mixer and wherein the flow outlet structure has a downstream portion with a cross-sectional flow area at least about the same as the nominal cross-sectional flow area.

21. The material flow amplifier of claim 20 wherein the at least one helical flow passage is at least partially defined by a helix vane having a helix vane first end proximate the flow expander to a helix vane second end proximate the flow mixer.

22. The material flow amplifier of claim 20 wherein a plurality of helical flow passages each extend between the exterior tubular body and the centralizer.

23. The material flow amplifier of claim 22 wherein each of the helical flow passages is at least partially defined by spaced apart helix vanes each having a helix vane first end proximate the flow expander to a helix vane second end proximate the flow mixer.

* * * * *